United States Patent [19]
Gallios et al.

[11] Patent Number: 4,893,227
[45] Date of Patent: Jan. 9, 1990

[54] PUSH PULL RESONANT FLYBACK SWITCHMODE POWER SUPPLY CONVERTER

[75] Inventors: George C. Gallios, Setauket; Charles Lien, Huntington; Remo Stella, Dix Hills, all of N.Y.; Wendell Boucher, Los Osos, Calif.

[73] Assignee: Venus Scientific, Inc., Farmingdale, N.Y.

[21] Appl. No.: 216,548

[22] Filed: Jul. 8, 1988

[51] Int. Cl.⁴ .......................................... H02M 3/335
[52] U.S. Cl. ........................................ 363/26; 363/61
[58] Field of Search ...................... 363/24, 25, 26, 61, 363/134

[56] References Cited
U.S. PATENT DOCUMENTS

| | | | |
|---|---|---|---|
| 3,539,903 | 11/1970 | Goebel | 363/61 |
| 3,911,292 | 10/1975 | Petrick et al. | 363/61 |
| 4,128,868 | 12/1978 | Gamble | 363/26 |
| 4,336,587 | 6/1982 | Boettcher et al. | 363/134 |
| 4,393,441 | 7/1983 | Enge | 363/61 |
| 4,563,731 | 1/1986 | Sato et al. | 363/17 |
| 4,581,690 | 4/1986 | Russell | 363/26 |
| 4,616,300 | 10/1986 | Santelmann | 363/61 |
| 4,628,426 | 12/1986 | Steigerwald | 363/26 |
| 4,677,534 | 6/1987 | Okochi | 363/26 |
| 4,709,323 | 11/1987 | Lien | 363/26 |
| 4,716,509 | 12/1987 | Roccucci | 363/26 |
| 4,751,628 | 6/1988 | Nollet | 363/26 |

*Primary Examiner*—Patrick R. Salce
*Assistant Examiner*—Jeffrey Sterrett
*Attorney, Agent, or Firm*—Ostrolenk, Faber, Gerb & Soffen

[57] ABSTRACT

A flyback converter high voltage power supply which includes two switches operating in push pull fashion to provide alternate polarity energy pulses to a load. A main component of the power supply is a transformer, the primary winding of which is divided into halves. The secondary may be also be split into halves, or may be configured without a split so long as the secondary and rectifier combination result in full wave rectification. The first of the two switches couples an input voltage across the first primary half to store energy in the magnetic core during a first time interval, and at the end of the first time interval disconnects the first primary half from the input voltage. During a second time interval, the energy stored in the magnetic core during the first time interval is delivered to the load via the secondary winding. The second of the two switches similarly couples the input voltage across the second primary half to store energy in the magnetic core during a third time interval, and then disconnects the second primary half from the input voltage at the beginning of the fourth time interval. During the fourth time interval, the energy stored in the magnetic core is again transferred to the load via the secondary. A duty factor modulator is used to control the switching of the first and second switches to vary the length of the time intervals in response to variations in the load and input voltage.

22 Claims, 4 Drawing Sheets

PUSH PULL RESONANT FLYBACK SWITCHMODE POWER SUPPLY CONVERTER

BACKGROUND OF THE INVENTION

1. Field of the Invention

The present invention relates to switchmode power supplies, and more particularly to resonant flyback converter switchmode power supplies.

2. Description of the Related Art

Switchmode power supplies for converting a first DC voltage to a second DC voltage are commonly used to power electronic systems. The first DC voltage may be from a DC voltage source, or from a rectified and filtered AC source. Such power supplies are generally used because of their relatively low cost, high efficiency, and high power density. The high power density is afforded by the high switching frequency used, enabling the use of much smaller, lighter, and lower cost magnetics and capacitors. The control circuits for such power supplies typically include a pulse generator or oscillator which generates a series of pulses whose width or frequency or both are modulated. These pulses are used to control the duration of applications of the DC input voltage across the power transformer in the normally single ended flyback power supply.

In general, a conventional switchmode power supply takes its input power from a DC voltage source which may be derived from an alternating current line via a rectifier filter combination. It consists of a power transformer including a primary winding and at least one secondary winding, a pulse generator for developing a train of pulses of varying pulse width as a function of the present value of the output voltage, and a transistor switch in series with the DC voltage source and the primary winding of the power transformer. This transistor switch is controlled by the pulses developed by the pulse generator such that the switch closes for the duration of each pulse. An attenuated sample of the output DC voltage is compared to a fixed reference voltage generating a voltage error, which is amplified by the error amplifier. This amplified error voltage either expands the width of the pulses in the pulse train to raise the output voltage, or narrows the width of the pulses to generate a lower DC output voltage, to thereby maintain the output DC voltage at the prescribed voltage level. Such feedback of the output DC voltage is necessary since otherwise the output voltage would vary inversely as a function of the varying demand of the load being powered by this output voltage and by variations in the input voltage. A rectifier and capacitive filter circuit are also connected to the secondary winding for smoothing the pulsating rectified output DC voltage.

One version of boost switching power supply topology is called a flyback power supply or flyback converter. In such power supplies, energy from the DC source is transferred first to the power transformer during a drive cycle and secondly to the output rectifier circuit during a flyback cycle, the output rectifier and filter circuit smoothing the output voltage. During the drive cycle, the transistor switch closes, thereby coupling a primary winding of the power transformer in series with the DC source. This develops a current in the transformer inductance causing energy to be stored in the transformer. No current flows in the secondary winding because of the reversed polarity the secondary winding applies to the rectifier circuit. When, however, the switch is opened, the current supplied from the DC source to the primary winding goes to zero and the magnetic field created by the current in the primary inductance starts to collapse. This induces a voltage of opposite polarity in the second winding, forward biasing the rectifier circuit, so it now conducts current that charges the output capacitor which powers the output load. The error amplifier compares the output voltage with a fixed reference voltage, causing the pulse width generator to develop the width modulated pulses to control the "on" time of the transistor switch during the drive cycle and thus the amount of magnetic energy stored in the power transformer.

The above-described concept of the resonant flyback using a single transistor is an old one, used in most TV sets. U.S. Pat. No. 4,616,300 to Santelmann discloses a circuit which supplies power to the load not only in conventional flyback mode, but also in the forward mode. This combination flyback/forward provides the alternate polarity energy pulses to the load required by high voltage multipliers used in CRT type high voltage converters.

In accordance with the Santelmann patent, the transistor switch is closed for a portion of each conversion cycle during which energy is delivered via the transformer to the voltage multiplier in the forward mode operation, and also energy is stored in the transformer magnetics to be delivered to the voltage multiplier during the flyback mode operation. The frequency and width of the modulating pulses produced by the control circuit of the Santelmann circuit are such that the natural frequency of the converter is tracked with the necessary duty factor. The natural frequency of the converter is the inverse of the natural period, which the sum of the subcycle intervals. These subcycle intervals are the charging of the magnetics and the forward mode energy delivery to the load; the resonant "ring" or flyback to the opposite polarity; the delivery of the opposite polarity energy to the load during flyback; and the resonant "ring" return to the starting condition. The resonant circuit controlling these "rings" is formed by the primary inductance of the transformer, and the stray capacitance of the secondary winding reflected to the primary of the transformer by the square of the secondary to primary turns ratio.

Referring to FIG. 3 of the Santelmann patent, the conversion cycle begins by turning on $Q_1$, which places the input voltage $E_{in}$ across the primary inductance, $L_p$, of the transformer and inductively across the secondary inductance, $L_s$ of the transformer (the turns ratio is assumed to be unity for simplification). During the time $Q_l$ is on, forward mode conduction is achieved in that the induced negative voltage across $L_s$ at the polarity dot is applied to the voltage multiplier load, causing current to flow in the voltage multiplier. This is unregulated in that the secondary voltage is related to the magnitude of the input voltage at that time.

Referring to FIG. 2 of Santelmann, which represents the flyback mode of operation, the items in FIG. 3 of Santelmann relative to FIG. 2 of Santelmann are $Q_1$ is S, $L_p$ is L, $C_s$ reflected to the primary of the transformer is represented by C. A summary of the description of the Santelmann resonant flyback is that when switch S is closed, diode D is reversed biased and does not conduct, while current i linearly increases with time to its peak value, $i_{pk}$, at which time the switch S is commanded open by the control circuit. The resonant circuit formed by C and L start their resonance as shown by Santelmann with the initial conditions of a voltage across C equal to $E_{in}$, and a current through L of $i_{pk}$. The resonance causes the voltage across the capacitor (which is equal to $E_{in}$ at Santelmann point e in the schematic) to decrease to zero, and the current in the inductor to increase slightly more to a value $i_{pk2}$, representing the energy transfer from the capacitor to the inductor. The inductor current causes the locus of the voltage at node e to increase sinusoidally toward a peak voltage across the capacitor of opposite polarity from the initial voltage, and of a magnitude equal to the product of $i_{pk2}$ and the characteristic impedance $Z_o$ of the resonant circuit formed by C and L, e.g. $Z_o = \text{Sqrt}(L/C)$. However, the design of the circuit for proper operation requires the output load voltage to be significantly lower than this peak. As shown by Santelmann's example, the 787 volt unloaded resonant peak across the capacitor is clamped at 318 volts across the capacitor by the load. In FIG. 3, while $Q_I$ is closed energy is stored in $C_s$ by the voltage impressed across it, and current linearly increases in $L_p$ from 0 volts to $E_{in}$, at which the current in $L_p$ is at its peak, and then to reverse the voltage across the drain toward a voltage determined by this peak current and the characteristic impedance, as described previously. When the induced secondary voltage resulting from this resonance reaches an appropriate level, diodes $D_5$, $D_4$ and $D_3$ conduct, recharging the multiplier capacitors. The magnitude of this recharge is controlled by the feedback circuitry providing the control to maintain the output voltage at the desired value.

When the inductor current reaches zero, there is no more current available for the forward conduction of $D_3$ to continue and it opens. The energy that remains on the stray capacitor $C_s$ causes the voltage e to fall as a cosine waveform in free resonance. The voltage falls from the high peak value related to the output voltage, to a value equal to $E_{in}$, during which time the current in $L_p$ increases, storing energy in the transformer core. This energy is then transferred to the capacitor as the voltage continues to resonate toward zero volts on the drain of the transistor. The magnitude of the energy stored in the inductor by design will normally cause the voltage to resonate to a negative value. However, it is limited to approximately zero volts by the clamping action of the body diode of the transistor. When the transistor body diode clamps, the remaining energy in the inductor is returned to the input voltage source. Completion of one cycle occurs when the current in $L_p$ has run down to zero. The start of the next cycle is the crossover of the $L_p$ current to a positive current, starting the storage of energy for the next cycle.

The capacitor $C_f$ (the combination of the multiplier circuit capacitors) is made very large, so that the voltage across the load $R_5$ remains relatively constant throughout the cycle; in essence, $C_f$ acts as a battery, the feedback circuit serving to maintain a constant charge on $C_f$ by varying the duty cycle of the transistor $Q_I$ and thus the energy injected into the circuit in response to energy delivered to the load.

While the Santlemann circuit advantageously supplies power to the load in both the flyback and forward modes, it does so non-symmetrically; i.e., the output impedances, voltages and current differ for the two modes, because in one mode the transistor switch is conducting, while in the other mode it is not conducting.

SUMMARY OF THE INVENTION

The circuit of the present invention differs from the above described Santlemann flyback converter in that it operates using two switches operating in push pull fashion to provide symmetrical alternate polarity energy pulses to the load.

An important component of the invention is a power transformer, the primary winding of which are divided into halves with an equal number of windings. The secondary winding(s) must reflect a full-wave load which may be achieved with a split secondary as shown, or with a unsplit secondary and a full-wave rectifier arrangement. The first of the two switches couples an input voltage across the first primary half to store energy in the magnetic core during a first time interval, and then disconnects the first primary half from the input voltage during a second time interval during which the energy stored in the magnetic core of the transformer is transferred to the secondary windings and delivered to the load. The second of the two switches similarly couples the input voltage across the second primary half to store energy in the magnetic core of the primary during a third time interval, and then disconnects the second primary half from the input voltage during a fourth time interval during which the energy stored in the magnetic core is again transferred to the secondary and delivered to the load.

An error amplifier and pulse width modulator combination is used to control the switching of the first and second switches to vary the length of the time intervals in response to variations in the load and input line voltage.

Figure 5:
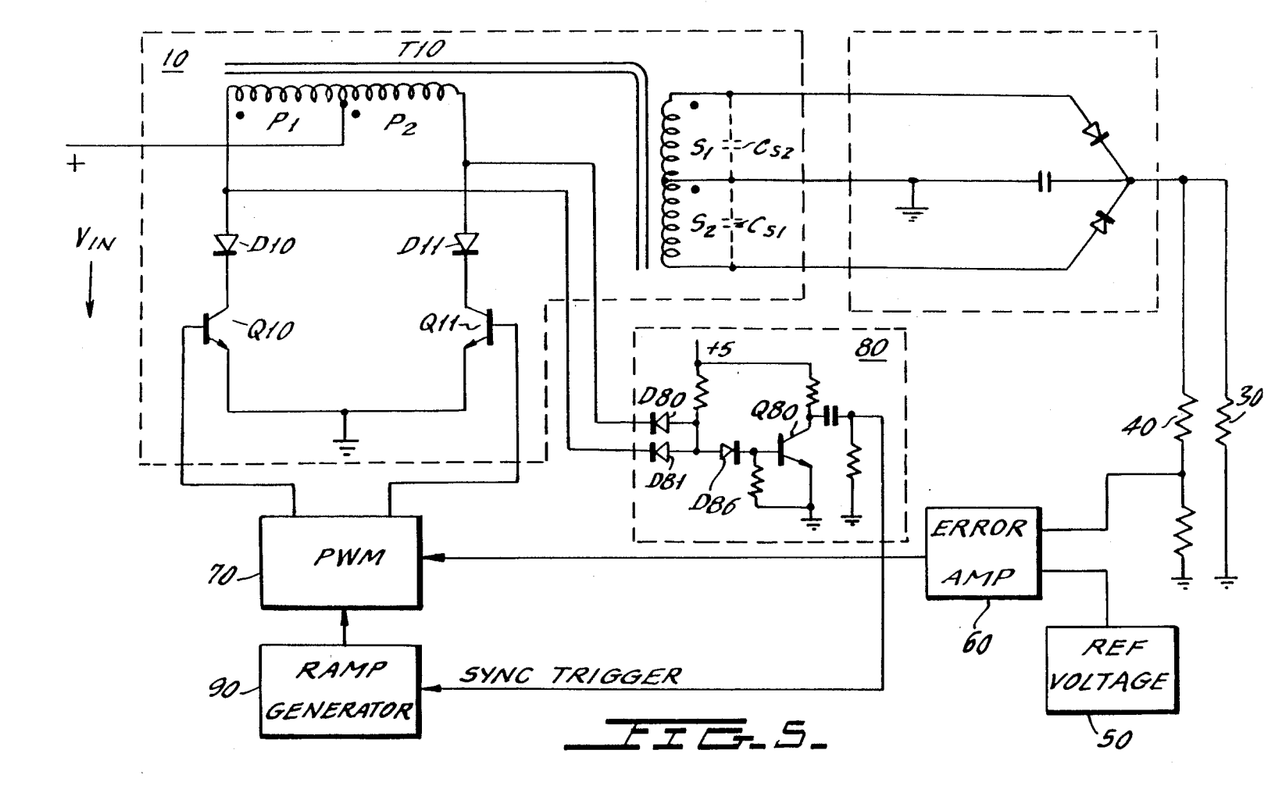
FIG. 5 is a schematic showing an alternative embodiment of the invention with bipolar switching transistors in the main power stage and a full wave rectifier circuit for delivering current to the load.

A full-wave high voltage multiplier is preferably used to deliver to the load energy from the secondary windings (although a simple full wave rectifier circuit can be used as well—see FIG. 5).

The switches are preferably FETs (although other types of transistors, such as bipolar transistors, can be used equally as well as shown in FIG. 5), and a coupled between each of the FETs and its respective primary half to prevent the drains of the FETs from swinging negative.

A feedback loop is used to control the pulse width modulator, the feedback loop including an attenuator for sampling a predetermined portion of the voltage output to the load, an error amplifier for comparing the predetermined portion to a reference voltage and amplifying the error, a trigger generator for providing a trigger pulse wherever the anode of either of the diodes coupled between the FETs and the transformer swings negative, and a ramp generator coupled to the trigger generator for providing a ramp voltage versus time which starts whenever a trigger signal is produced by the trigger generator. This ramp voltage and the amplified error signal are fed to the pulse width modulator to control the length of its output pulses and thus vary the length of time the FETs are switched on and off. The trigger pulse and trigger generator synchronize the pulse train frequency to the natural frequency of the power stage. The frequency synchronizer and pulse width control operate to provide the correct duty factor to achieve the correct output.

A third FET may be optionally coupled across taps on the secondary to temporarily short the secondary in order to extend the total operational interval to a fixed value resulting in a fixed frequency.

The structure of the present invention provides the following advantages:

Has symmetrical, identical output impedances, voltages and currents for the positive and the negative output voltage swings, which is very beneficial for some loads such as a full-wave Cockroff Walton high voltage multiplier;

Affords benefits in better magnetics utilization, since the magnetic flux swing can be more than twice that of a single sided circuit;

Has an output ripple frequency which is twice the switching frequency, and therefore easier to filter;

Has higher output power because of the use of two switches;

Has little or no dc current in the primary since the push pull topology produces waveforms which are symmetrical about zero.

Is able to operate at a fixed frequency, and

Is capable of being synchronized to an external fixed frequency compatible with the switching requirements.

As in prior art converters producing low output voltages, the present invention also uses partial resonance to change the voltage on the converter switches from essentially twice the input supply voltage, to near zero volts just prior to the time the transistors are switched on, e.g. "zero voltage switching" (ZVS). ZVS essentially eliminates switching losses which allows operation at significantly higher frequencies with good efficiency, at switching frequencies up to 20 megaHertz.

In high voltage output converters the use of this partial cycle resonance (also known as Quasi-Resonance) is even more important for high efficiency performance, since it is used for lossless reversal of voltage on the secondary stray capacitance as part of the switching cycle. This will afford acceptable performance in kilovolt converters at switching frequencies even above several hundred kiloHertz. For example, a 1 kilowatt, 200 KHZ converter utilizing a transformer secondary voltage of 6000 volts peak to peak might have a stray capacitance of 50 picofarads. If quasi-resonant switching were not used, the resulting additional switch dissipation could be 180 watts, 18% of the total power! With the zero voltage switching as implemented in the present invention, this switching dissipation is essentially eliminated.

These and other features and advantages of the invention are described below, with reference to the accompanying drawings.

DETAILED DESCRIPTION OF THE PREFERRED EMBODIMENT

Figure 1:
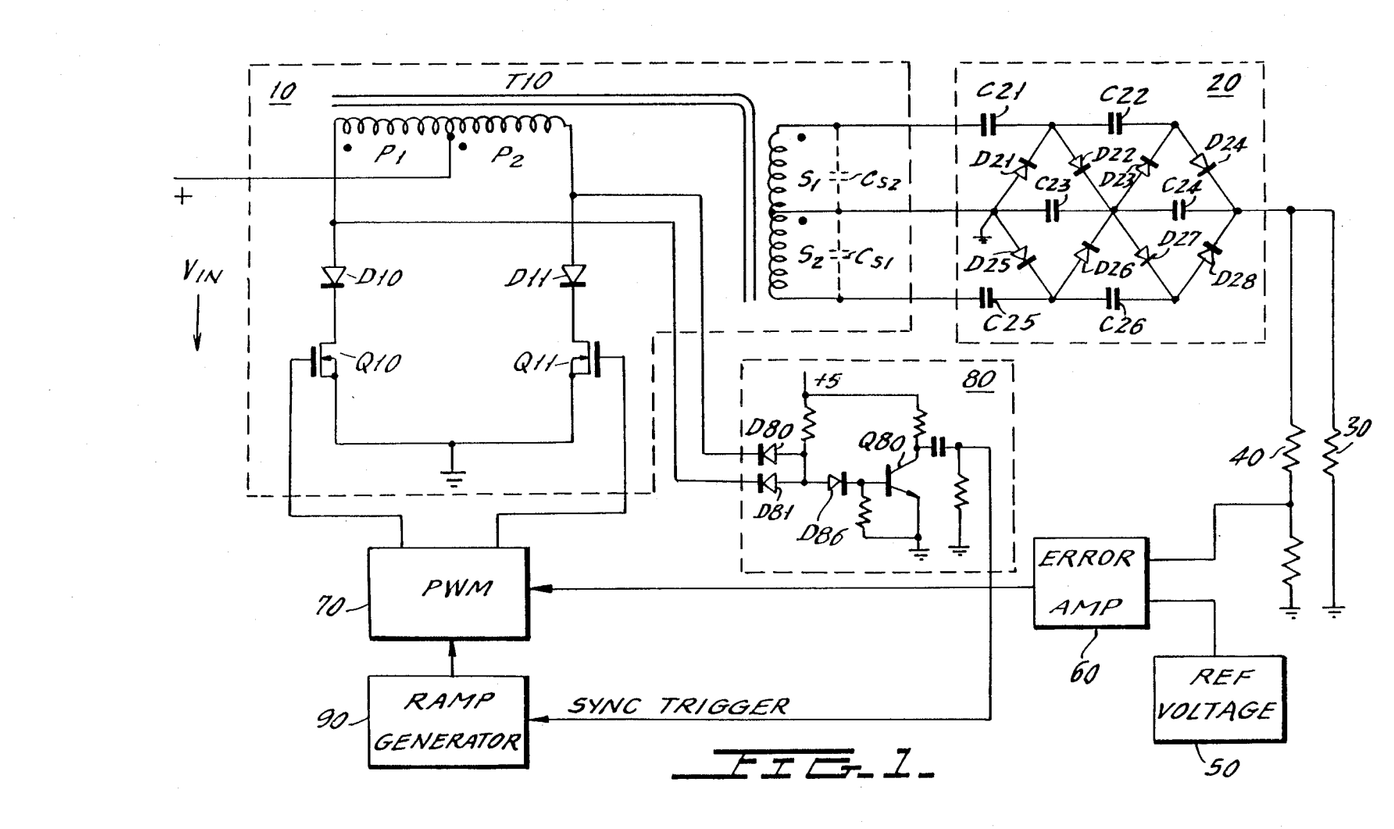
FIG. 1 is an overall block diagram/schematic of the push pull resonant flyback switchmode converter of the present invention.

FIG. 1 shows an overall block diagram/schematic of the Push Pull Resonant Flyback Switchmode Converter of the present invention, in which the major components are:

The main power stage 10 consisting of:
 (i) The output transformer T10, which for high voltage applications the ratio of Ns1/Ns2, (step up) may be as high as 100. For this discussion the ratio used is unity (1) so the relationship of the transformer primary and secondary currents are more evident.
 (ii) The control switches, which are shown implemented as FETs Q10 and Q11.
 (iii) Blocking diodes D10 and D11, without which the FET drain voltage would swing negative, causing the FET body diodes to conduct, which is unacceptable for the operation of the circuit, as will be explained later.

A two stage full-wave Cockroff-Walton high voltage multiplier 20 which consists of:
 (i) AC capacitors C21, C22, C25 and C26
 (ii) DC capacitors C23 and C24, and
 (iii) Diodes D21 through D28 inclusive.

The electrical load 30 on the high voltage multiplier,

The attenuator 40 which provides a fixed portion of the high voltage output for use as the feedback signal. For a 25 kv output, this attenuator may be as high as 2500:1, resulting in a 10 volt feedback signal, A reference voltage 50 at a level compatible with the feedback signal, such as 10 volts, The error amplifier 60 which compares the feedback signal to the reference voltage, and suitable amplifies this error to satisfy the needs of the total control function.

The Pulse Width Modulator 70, which provides the appropriately modulated drive voltages to the control FETS Q10 and Q11. The inputs to the PWM are the amplified error voltage and the synchronized ramp generator.

The Trigger Generator 80, which produces a trigger pulse whenever the voltage at either the anode of diode D10 or the anode of D11 swings negative. This circuit synchronizes the frequency of the Ramp Generator to the natural frequency of operation of the resonant power stage.

The Ramp Generator 90 which provides the ramp voltage versus time which starts whenever a trigger signal is received. It also produces a ramp at a lower frequency in the absence of the trigger which provides for start up and to keep the circuit operating properly in the event that any specific trigger pulse is not properly generated.

Figure 2:
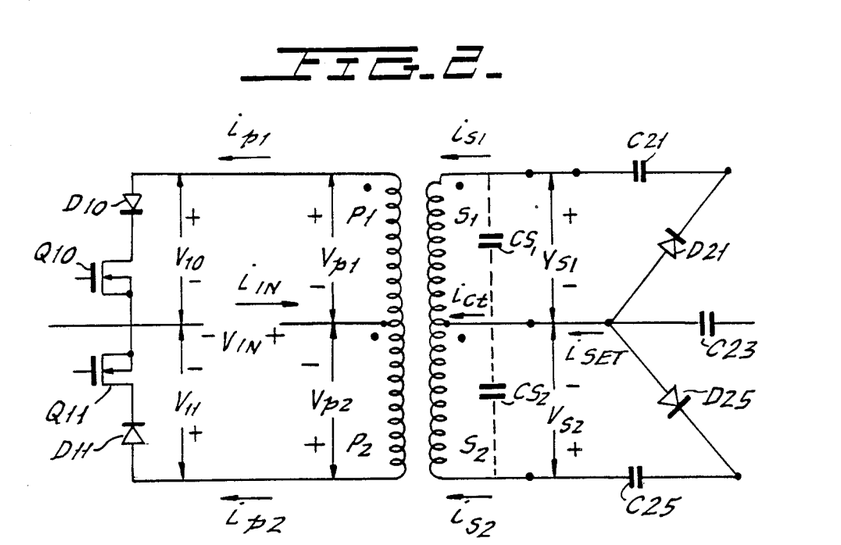
FIG. 2 is a detailed schematic of the main power stage in the circuit of the present invention.

The essence of the present invention lies within the power block 10, pulse width modulator circuit 70, and the trigger circuit 80. FIG. 2 is a detailed schematic of power block 10, which has the waveforms shown in FIG. 3. As will become evident from the following description, the topology is essentially two resonant flyback circuits with their individual operating sequences interlaced in such a manner that they not only do not interfere with one another, but together provide push pull, balanced output, essentially eliminating the DC current unbalance in the transformer primary winding. Transformer T10 has two primary halves, namely P1 and P2 with equal primary windings Np1 and Np2, and similar secondary halves S1 and S2 with equal secondary windings Ns1 and Ns2. In high voltage converters using high voltage multipliers, such as would be the case for a CRT power supply, the input supply voltages range from 20 to 300 volts, and the secondary voltages across each secondary half range from 2000 to 6000 volts peak to peak, resulting in step up turns ratios of from 10 to 100. To make the following explanations more understandable, the turns ratio, defined as Np1/Np2, is unity so the primary and secondary currents will have equivalent scaling. All the voltages and impedances have been appropriately scaled.

Associated with transformer T10 are its secondary winding stray capacitances, Cs1 and Cs2, where Cs1=Cs2=40 pfds. For a typical converter operating from a 30 volt source, a typical turns ratio (Np1/Np2) would be 60, resulting in a secondary voltage across S1 of 3600 volts peak to peak. The resulting capacitances across S1 and S2 reflected to primary P1 calculates to be 0.29 μfd. This 0.29 μfd is the capacitance of the flyback resonant circuit, defined as Crp (capacitor, resonant, primary). The inductance of transformer primary winding P1 is the resonant inductor, defined as Lrp. For a typical 100 kHz resonant circuit frequency, Lrp, the inductance of P1, has the value of 8.7 μhys. For the turns ratio of 60, the secondary inductance of Ns1, Lrs, is 0.031 henrys.

The values of the components of the high voltage multiplier are not significant to the understanding of this invention, so long as voltages Vs1 and Vs2 are clamped to a fixed voltage, Vso, when the multiplier rectifiers of the multiplier are conducting. Vso referred to the primary is Vpo. For unity turns ratio Vpo=Vso.

One full switching cycle period, Tp, is divided into two half periods, namely Tp1/2, when primary winding P1 is in use, and Tp2/2 when primary winding P2 is in use. The definition of currents and voltages are self evident from FIG. 2.

Consider the initial conditions-the half period Tp2/2 is just ending, and Tp1/2 is just starting. Under these conditions:

is1=is2=0 amps, ip1=ip2=0 amps,

Vp1=Vs1=−Vpo

Vp2=Vs2=+Vpo

V10=Vp1+Vin=−(Vpo−Vin)

V11=Vp2+Vin=+(Vpo+Vin)

As will be explained later, Vpo must be equal to or greater than the maximum value of Vin for normal operation, e.g. other than short time transients, resulting in Vp1 being larger in magnitude than Vin. Thus V10 is initially negative, and V11 is a high positive voltage, somewhat higher than twice Vin.

At this point, transistor Q11 is off, and transister $Q_{10}$ may be on or off since it will not conduct in any event because diode $D_{10}$ is reversed biased; the high voltage multiplier rectifiers have just ceased conducting current; no current is flowing in Lrp; Cs1 is charged to −Vpo; and Cs2 is charged to +Vpo. Therefore, at the start of Tp1/2, and the t1 interval (0 to T1), the voltage on Cs1 and Cs2 starts to resonate from |Vpo| toward |Vin| with a cosine waveform at a resonant frequency Fr=1/(2*pi*Sqrt(Lrp*Crp)), where Crp is Cs1 and Cs2 reflected parallel combination across P1 (or P2). The characteristic impedance, Zo, of this resonant circuit is Sqrt(Lrp/Crp). If the resonance were allowed to proceed for at least a full quarter cycle, the maximum current Ip1max which would flow in the inductor, Lrp1, would be Is1max=Is2max, where Is1max=Is2max=Vso/Zo, and as previously stated Vso=Vpo. It is desirable to switch Q10 on while V10 is negative, so Q10 is switched under zero voltage and zero current conductions, excellent for high efficiency switching. As Vpl resonates positive towards Vin, V10 changes from −(Vpo−Vin), a negative voltage in a positive direction, crossing zero voltage, and then to a positive voltage. When V10 reaches about +1.0 volt, diode D10 becomes forward biased and starts to conduct, with current also flowing through Q10. This occurs at T1, the end of the first part of the first half cycle.

At T1, the relative conduction angle $\theta_{T1}$ of the resonant cycle is:

$\theta_{T1}$=ARCCOS (Vpo/Vin), radian neglecting the forward voltage drop of diode D10 and the IR drop across the FET. T1 can be calculated knowing Wr, the radian resonant frequency of the circuit formed by Lrp and Crp, and iT1, as:
ti T1=$\theta_{T1}$/Wr, and Is1T1=Is2T1=0.5*Ip1max*sin($\theta$T1), where Ip1max=Is1max+Is2max.

Now at T1, with transistor Q10 in saturated condition, the voltage Vin is clamped across primary P1. As a result, the resonance ceases, and (since the voltage change across Cs1 and Cs2 has ceased) the currents through Cs1 and Cs2 cease. However, the currents flowing in Lrp cannot cease instantaneously, and so now flow as Ip1T1, where Ip1T1=Is1T1+Is2TI and Is1T1=Is2T1. Ip1T1 is the initial current at the start of the inductor current recharge time, t2, which is from T1 to T2.

The control loop, including the feedback attenuator, the reference voltage, the error amplifier, the ramp generator and the PWM work together to cause Q10 to be switched on somewhere between 0 and T1, and to conduct from T1 to T2. This loop decides when time T2 should occur, and thereby establishes the appropriate current level and energy in Lrp for proper output voltage. The current in Lrp at T1 is Ip1T1, and at T2 is Ip1T2. With voltage Vin across Lrp, the current increase rate, dip1/dt=Vin/Lrp. The current added to Ip1T1 to achieve Ip1T2 is (dip1/dt)*(T2-T1), all in consistent units. The energy in Lrp at T2 is 0.5*Lrp*(Ip1T2 2), and the energy in Cs1 and Cs2 is 0.5*Cs1*(Vin 2) each, since Cs1=Cs2.

T2 ends and the t3 interval begins when Q10 is switched off. The t3 interval is defined as the time between T2 and T3. During this interval the "resonant flyback" occurs which causes the energy stored in Cs1 and Cs2 first to be totally converted to inductive energy in Lrp, which occurs when Vs1=Vs2=0 volts near the mid time between T2 and T3, shown on FIG. 3 as T2A. This resonance then continues to a point where the Vs1 has changed from −Vin at T2 to +Vin at a time almost to T3. At this point all the energy which had been removed from Cs1 and Cs2 between T2 and T2A, has been restored to them, but with reversed polarity voltage. This time is shown on FIG. 3 as T2B. This "non dissipative" reversal of voltage on Cs1 and Cs2 is one of the primary reasons for the increased efficiency available from resonant converters. The resonance continues further until the voltage Vp1 at T3 is equal to Vpo, where the high voltage multiplier rectifiers start to conduct, clamping Vs1 and Vs2 to |Vpo|. This ends time interval T3 and starts interval t4. Consider the plots of is1 and is2 from T2 to T3. At T2, the current magnitudes are Ip1T2/2 each. From T2 to T2A, the currents increase at the resonant frequency, and peak at T2A. The currents decrease from T2A to T2B, mirror imaged in time about T2A. The magnitude of the currents at T2 and T2B are equal, and of the same sign. From T2B to T3, the current in Lrp decreases slightly reflecting the transfer of some energy from Lrp to Cs1 and Cs2 to achieve the higher voltage |Vpo| on Cs1 and Cs2.

Figure 3:
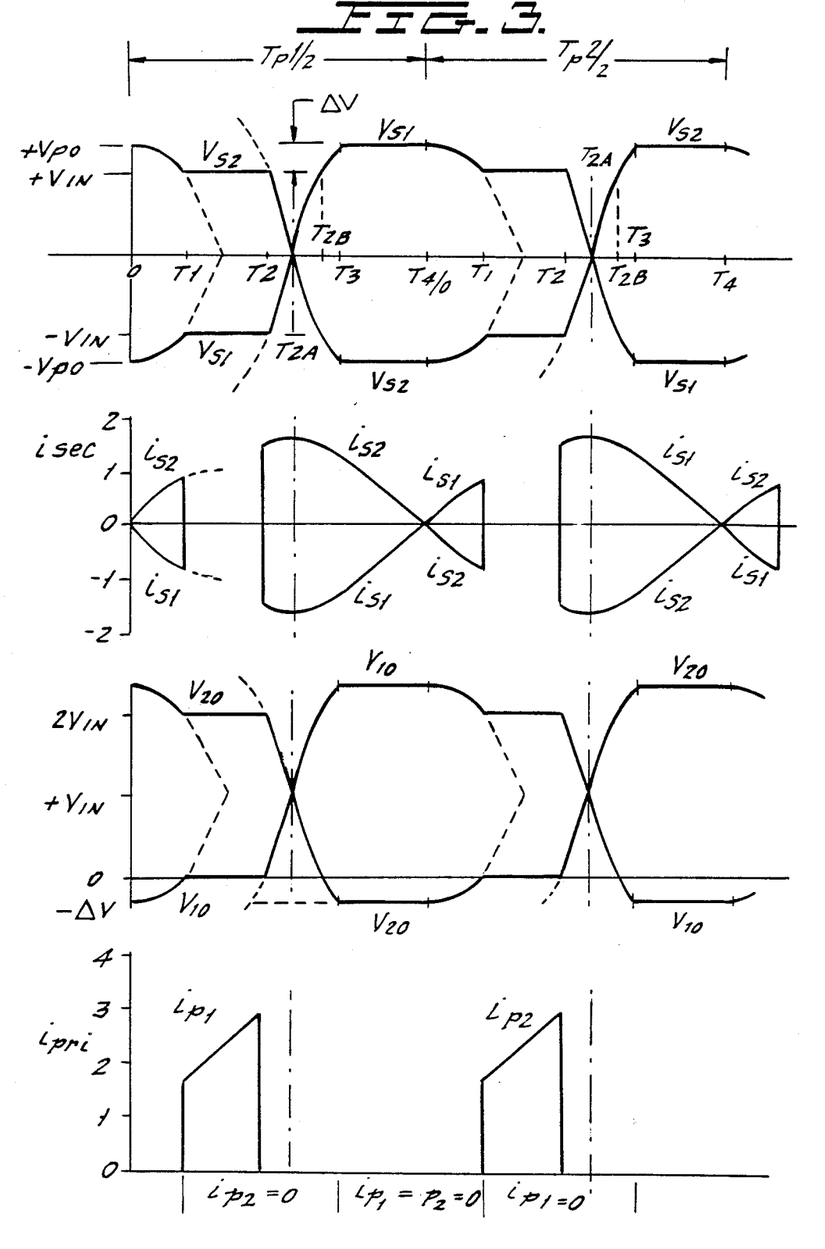
FIG. 3 is a diagram showing the voltage and current waveforms of the main power stage of the invention.

The time from T3 to T4 is the inductor discharge interval, t4. During this time, the energy in Lrp at T3 is delivered to the high voltage multiplier. The rate of change of is1 and is2 in this interval is defined as disxt4/dt=−Vpo/Lrp. The current in Lrp at T3 is Ip1T3, which can be readily calculated from energy consideration. Since the primary current is shared between the two secondary currents, Is1T3=Is2T3=Ip1T3/2. The interval from T3 to T4 is the time to discharge the current in Lrp, e.g. Is1t3, which is Is1T3/([dIs1t4/dt]). T4 is the end of this discharge and is also the end of the half cycle Tp1/2, and the start of the next half cycle Tp2/2. dIs1t4/dt is equal to Vpo/Lp.

The waveforms of Tp2/2 are essentially the same form and amplitude as those of Tp1/2, but are related to transformer primary half P2, transistor Q11 and diode D11. The operation continues alternating between Tp1/2 and Tp2/2.

Each half switching interval delivers a controlled block of energy to the high voltage multiplier, which at the switching frequency represents output power. At very low power levels, the switching frequency is almost the resonant frequency of Lpr and Cpr. As the power demands on the converter increase, the charge interval T2−T1, and the discharge interval T4−T3 increase accordingly, which causes the switching frequency to decrease. Thus, as the power demands or the input line voltage change, the switching frequency changes, unless otherwise stabilized.

Vpo must be larger in magnitude than the maximum value of Vin. If Vpo magnitude was less than Vin, then when transistor Q10 or Q11 switch on impressing Vin across transistor primary P1 or P2, the secondary voltages Vs1 or Vs2 would be greater than Vin, and would exceed Vso, the input voltage to the multiplier for which the HV multiplier rectifiers conduct. Since the input voltage to the multiplier would be larger than the multiplier input voltage, Vso multiplier rectifiers would conduct, increasing the multiplier voltage from Vpo to Vin, which would also increase the multiplier output voltage. If the control point was a voltage lower than the increased multiplier output, the decreased amplified error signal would command the PWM electronics to decrease the drive to a very narrow pulse, causing the output to fall to the appropriate voltage. This is a forward converter mode of operation, which is very different from the flyback mode, where the energy is stored in the inductor. In the forward converter mode, the leakage inductance (not shown) of the transformer is the forward converter averaging inductor. This is not as efficient as the flyback mode, since the transistors would have to switch on under load, and would have to conduct very high peak currents, both of which are high loss modes of operation. This forward converter operation is in fact the turn on mechanism of this converter until the stabilized control point is reached.

This shows that for the converter to operate in the desired push pull resonant flyback mode, the high voltage multiplier input clamp voltage, Vpo, reflected to half the primary must be larger than the maximum supply input voltage, Vinmax. This is a requirement of any Push Pull, e.g. balanced resonant flyback converter. This same condition is not a requirement of a single sided resonant flyback converter.

The trigger generator, designated by reference numeral 80, is essentially a high voltage equivalent of a two input NOR gate. For most of the time, the anodes of diodes D10 and D11 will be positive, resulting in a positive voltage at the cathodes of D80 and D81. Under these conditions, transistor Q80 is saturated, and the output of the trigger generator is zero volts. As the output at the anode of D10 or D11 crosses zero with a negative going voltage, transistor Q80 is cut off, causing a positive pulse at the output of the trigger generator. The ramp generator, designated by reflective numeral 90, is designed to free run at a frequency lower than the lowest converter operating frequency. The positive pulse from the trigger generator retriggers the ramp generator, synchronizing it with the needs of the power stage.

The lowest switching frequency, Fs1, will occur for the condition of maximum load and minimum line voltage, which will cause the longest time periods, Tpmax. The fixed switching frequency, where the switching frequency is slightly lower than the minimum operating frequency, results in a time period slightly longer than Tpmax, Tpfixed. To achieve the fixed time Tpfixed, a variable time delay, tpvar, must be introduced into the power stage to suspend the operation of the circuit, holding all the voltages and currents constant for time tpvar. At the end of tpvar, releasing the currents and voltages will allow the circuit to proceed as if no delay had occurred. FET Q100 controlled by a sense control 101 as shown in FIG. 4 can provide this type of circuit operation time suspension with very little additional loss.

Figure 4:
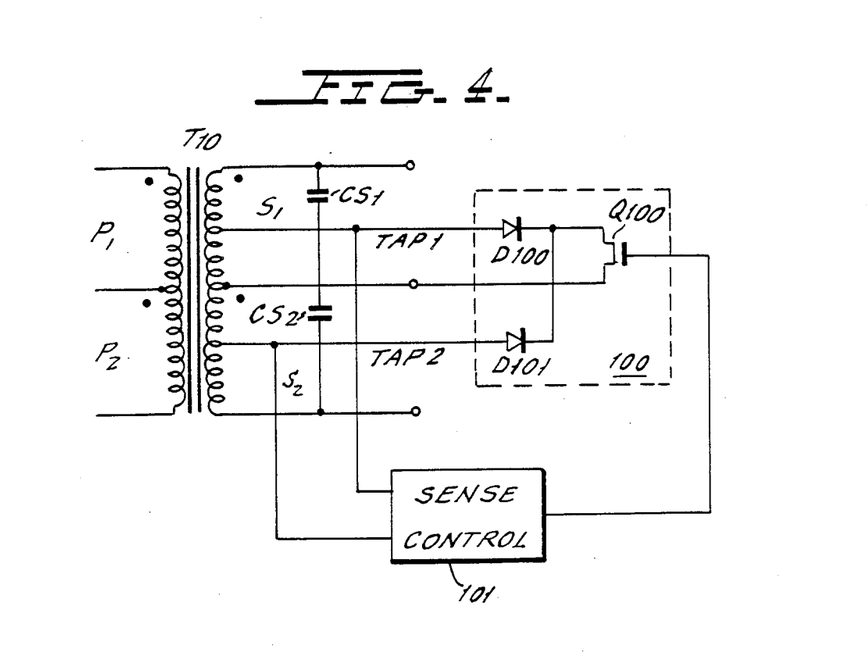
FIG. 4 is a schematic showing an alternative embodiment of the secondary circuit with two additional taps on the secondary winding.

In FIG. 4, transformer T10 is the same as T10 in FIG. 1, except it has taps on the secondary winding at Tap1 and Tap2. At time T2A (FIG. 3), transistors Q10 and Q11 are off, and the high voltage multiplier diodes are not conducting, so the multiplier is essentially disconnected from the transformer windings, the voltages on the windings of the transformer have resonated to zero (e.g. all the energy on the stray capacitors is zero), and all the energy in the circuit (other than in the HV multiplier capacitors) has been converted to magnetic energy in the form of transformer secondary current. If, at this moment, the secondary of the transformer were shorted, neglecting the loss in the circuit of item 100 and the transformer secondary copper loss, this state could be held indefinitely. When the transistor Q100 was finally released, the circuit would continue with its resonance. In effect, as the inductor Lpr charge and discharge periods increase/decrease, the time delay of the clamp would decrease/increase by the same amount, to maintain the switching frequency at a fixed value. This would be readily accomplished by triggering the current release/resonance restart from a fixed frequency source. Since this could be an external source, this technique allows synchronization of the converter to an external frequency source compatible with the needs of the converter.

Sensing the voltage at Tap1 or Tap2 as it crosses zero is conceptually straightforward, but it requires very fast circuits to cause Q100 to clamp while the voltage at these taps is still low, for efficient clamping. A better way is to sense the decrease in the voltage in either direction to say 50% of the peak voltage, which will provide some lead time. If needed, additional fixed trim delays can be incorporated into the circuit for optimum efficiency.

Computations of the power loss with this technique of fixed frequency operation for a 25 watt converter operating with a resonant circuit of 100 kHz is less than 5% using a 500 volt FET operating at 300 Volts peak.

The use of the two diodes, D100 and D101 allows one transistor to short both directions of current flow to the secondary center tap. The transformer secondary taps, Tap1 and Tap2 are used to allow using the maximum usable voltage, and minimum current through the diodes and the transistor, e.g. impedance match, in the interest of efficiency. If the primary winding had the appropriate impedance, or if an overwind on the primary were acceptable, then this current clamping circuit could be located on the primary side of the transformer.

Consider the resonant flyback converter discussed above including the resonant frequency of 100 kHz. Computations show the minimum switching frequency for full power at minimum line would be about 70 kHz. This swing in switching frequency computes to a change in the half period delay of less than 2.2 $\mu$sec. Holding the current for 2.5 $\mu$sec in each half period would result in a fixed switching frequency of 66.7 kHz.

This fixed frequency technique is compatible with almost any topology which uses quasi-resonant voltage reversal, since it is active at or near the transformer zero voltage conditions, when the other components of the power stage are not conducting.

Although the present invention has been described in connection with a preferred embodiment thereof, many other variations and modifications will now become apparent to those skilled in the art without departing from the scope of the invention. It is preferred, therefore, that the present invention be limited not by the specific disclosure herein, but only by the appended claims.

What is claimed is:

1. A push pull resonant flyback switchmode power supply converter for supplying power to a load, comprising:
   (a) a transformer having a primary and a secondary, said primary comprising first and second primary halves with an equal number of primary turns;
   (b) first switch means for coupling an input voltage of an input power supply across said first primary half during a first series of time intervals to store energy from said input power supply in the form of current in the inductance of said primary without resonance and for disconnecting said first primary half from said input voltage during a second series of time intervals during which the current in the inductance of said primary is transferred to said secondary, said secondary having an inductance and a parallel stray capacitance, the energy stored in the form of voltage in said stray capacitance being transferred in the form of current to the inductance of said secondary by parallel resonance, the current in the inductance of said secondary being delivered to said load when the voltage across said stray capacitance resonates to a predetermined level which is greater than said input voltage;
   (c) second switch means for coupling said input voltage of said input power supply across said second primary half during a third series of time intervals to store energy from said input power supply in the form of current in the inductance of said primary without resonance and for disconnecting said second primary half from said input voltage during a fourth series of time intervals during which the current in the inductance of said primary is transferred to said secondary, the energy stored in the form of voltage in the stray capacitance of said secondary being transferred in the form of current to the inductance of said secondary by parallel resonance, the current in the inductance of said secondary being delivered to said load when the voltage across said stray capacitance resonates to said predetermined level which is greater than said input voltage;
   (d) pulse width modulating means for controlling the switching of said first and second switch means to vary the length and frequency of said time intervals in response to variations in the load and in said input voltage; and
   (e) means for synchronizing said pulse width modulating means to the frequency of said time intervals as required by the resonant frequency of the parallel stray capacitance and inductance of said secondary.

2. A push pull resonant flyback switchmode power supply converter as recited in claim 1, wherein said secondary comprises first and second secondary halves and a third switch means is coupled across taps on said first and second secondary halves for temporarily shorting the secondary of said transformer to temporarily suspend said resonance to set the frequency of the switching of said first and second switch means at a substantially fixed frequency.

3. A push pull resonant flyback switchmode power supply converter as recited in claim 1, wherein said secondary comprises first and second secondary halves with an equal number of secondary windings.

4. A push pull resonant flyback switchmode power supply converter as recited in claim 1, wherein said first and second switch means comprise first and second FET transistors, respectively.

5. A push pull resonant flyback switchmode power supply converter as recited in claim 4, further comprising first and second diodes coupled between said first and second FET transistors and said first and second primary halves, respectively, the anodes of said diodes being coupled to said primary halves and the cathodes of said diodes being coupled to the drains of said FETs, said diodes preventing the voltage at the drains of said FETs from swinging negative.

6. A push pull resonant flyback switchmode power supply converter as recited in claim 5, further comprising an attenuator for providing a predetermined portion of the voltage output delivered to the load for use as a feedback signal, a reference voltage at a level compatible with said feedback signal, an error amplifier for comparing said feedback signal to said reference voltage to generate an error signal and for amplifying said error signal, a trigger generator for producing a trigger pulse whenever the voltage at the anode of either said first or second diodes swings negative, and a ramp generator coupled to said trigger generator for providing a ramp voltage versus time which starts whenever a trigger signal is produced by said trigger generator to provide said synchronization, said ramp voltage from said ramp generator and said amplified error signal from said error amplifier being fed to said pulse width modulator for controlling the length of pulses output by said pulse width modulator, the length of said pulses controlling the length of time said first and second FETs are switched on and off.

7. A push pull resonant flyback switchmode power supply converter as recited in claim 1, wherein said first and second switch means comprise first and second bipolar transistors, respectively.

8. A push pull resonant flyback switchmode power supply converter as recited in claim 7, further comprising first and second diodes coupled between said first and second bipolar transistors and said first and second primary halves, respectively, the anodes of said diodes being coupled to said primary halves and the cathodes of said diodes being coupled to the collectors of said bipolar transistors, said diodes preventing the voltage at the collectors of said bipolar transistors from swinging negative.

9. A push pull resonant flyback switchmode power supply converter as recited in claim 8, further comprising an attenuator for providing a predetermined portion of the voltage output delivered to the load for use as a feedback signal, a reference voltage at a level compatible with said feedback signal, an error amplifier for comparing said feedback signal to said reference voltage to generate an error signal and for amplifying said error signal, a trigger generator for producing a trigger pulse whenever the voltage at the anode of either said first or second diodes swings negative, and a ramp generator coupled to said trigger generator for providing a ramp voltage versus time which starts whenever a trigger signal is produced by said trigger generator to provide said synchronization, said ramp voltage from said ramp generator and said amplified error signal from said error amplifier being fed to said pulse width modulator for controlling the length of pulses output by said pulse width modulator, the length of said pulses controlling the length of time said first and second bipolar transistors are switched on and off.

10. A push pull resonant flyback switchmode power supply converter as recited in claim 1, further comprising a rectifier and filter circuit for delivering to the load the energy transferred from said primary inductance to said secondary.

11. A push pull resonant flyback switchmode power supply converter as recited in claim 10, wherein said rectifier and filter circuit comprises a high voltage multiplier.

12. A push pull resonant flyback switchmode power supply as recited in claim 10, wherein said rectifier and filter circuit comprises a full wave rectifier arrangement.

13. A method of supplying high voltage to a load using a resonant flyback circuit with a main power stage comprising a transformer having a primary and a secondary, said primary formed of first and second primary halves with an equal number of primary windings, said method comprising repeating a switching interval, which interval comprises the steps of:

(a) switching an input voltage of an input power supply across said first primary half during a first time interval to store energy from said input power supply in the form of current in the inductance of said primary without resonance;

(b) disconnecting said first primary half from said input voltage during second a time interval during which the current in the inductance of said primary is transferred to said secondary, said secondary having an inductance and a parallel stray capacitance, the energy stored in the form of voltage in said stray capacitance being transferred in the form of current to the inductance of said secondary by parallel resonance, the current in the inductance of said secondary being delivered to the load when the voltage across said stray capacitance resonates to a predetermined level which is greater than said input voltage;

(c) switching said input voltage of said input power supply across said second primary half during a third time interval to store energy from said input power supply in the form of current in the inductance of said primary without resonance;

(d) disconnecting said second primary half from said input voltage during a fourth time interval during which the current in the inductance of said primary is transferred to said secondary, the energy stored in the form of voltage in the stray capacitance being transferred in the form of current to the inductance of said secondary by parallel resonance, the current in the inductance of said secondary being delivered to the load when the voltage across said stray capacitance resonates to said predetermined level which is greater than said input voltage;

(e) controlling the duration and frequency of the switching and disconnecting of steps (a) through (d) in response to variations in the load and in said input voltage; and (f) controlling the frequency of the switching set forth in steps (a) through (d) to synchronism the controlling of the switching with the time intervals as required by the resonant frequency of the stray capacitance and inductance of said secondary.

14. A method as recited in claim 13, further comprising the step of rectifying and filtering the energy delivered to the load after the energy has been transferred from said primary to said secondary.

15. A method as recited in claim 14, wherein said rectifying and filtering is performed by a high voltage multiplier.

16. A method as recited in claim 13, wherein said switching and disconnecting in steps (a) and (b) is performed a first FET transistor and said switching and disconnecting in steps (c) and (d) is performed by a second FET transistor.

17. A method as recited in claim 16, wherein the drains of said first and second FET transistors are prevented from switching negative by coupling first and second diodes between said first and second FET transistors and said first and second primary halves, respectively.

18. A method as recited in claim 17, wherein the duration of the switching and disconnecting of steps (a) through (d) is controlled by comparing the output voltage delivered to the load against a reference voltage to generate an error signal, amplifying said error signal, producing a trigger pulse whenever the anode of either said first or second diode swings negative, providing a ramp voltage versus time which starts whenever a trigger signal is produced to provide said synchronization, and feeding said ramp voltage and said amplified error signal to a pulse width modulator for controlling the length of time said first and second FETs are switched on and off.

19. A method as recited in claim 13, wherein said switching and disconnecting in steps (a) and (b) is performed by a first bipolar transistor, and said switching and disconnecting in steps (c) and (d) is performed by a second bipolar transistor.

20. A method as recited in claim 19, wherein the collectors of said first and second bipolar transistors are prevented from switching negative by coupling first and second diodes between said first and second bipolar transistors and said first and second primary halves, respectively.

21. A method as recited in claim 20, wherein the duration of the switching and disconnecting of steps (a) through (d) is controlled by comparing the output voltage delivered to the load against a reference voltage to generate an error signal, amplifying said error signal, producing a trigger pulse whenever the anode of either said first or second diode swings negative, providing a ramp voltage versus time which starts whenever a trigger signal is produced to provide said synchronization, and feeding said ramp voltage and said amplified error signal to a pulse width modulator for controlling the length of time said first and second bipolar transistors are switched on and off.

22. A method as recited in claim 13, further comprising the step of temporarily shorting the secondary of said transformer during said switching interval to temporarily suspend operation of the power supply to set the frequency of the switching and disconnecting in steps (a)-(d) at a substantially fixed frequency.

* * * * *